United States Patent
Hiwatashi et al.

(10) Patent No.: US 7,447,573 B2
(45) Date of Patent: Nov. 4, 2008

(54) DRIVING CONTROL DEVICE FOR A VEHICLE

(75) Inventors: Yutaka Hiwatashi, Tokyo (JP); Atsuyoshi Takazawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 693 days.

(21) Appl. No.: 11/004,066

(22) Filed: Dec. 6, 2004

(65) Prior Publication Data
US 2005/0125115 A1    Jun. 9, 2005

(30) Foreign Application Priority Data
Dec. 8, 2003 (JP) ............................. 2003-409529

(51) Int. Cl.
*G01C 22/00* (2006.01)
(52) U.S. Cl. ..................... 701/25; 701/23; 701/207; 701/209; 340/988; 340/989; 340/991; 340/995.25; 342/357.01; 342/357.03; 342/357.08
(58) Field of Classification Search ............... 701/23, 701/25, 207, 209, 216–217, 300; 340/988, 340/989, 991, 995.25, 996; 342/357.01, 342/357.03, 357.08, 357.09, 357.13
See application file for complete search history.

(56) References Cited

U.S. PATENT DOCUMENTS 5,677,837 A    10/1997    Reynolds 6,546,336 B1 *  4/2003  Matsuoka et al. ........... 701/213
2001/0056326 A1  12/2001  Kimura
2002/0161517 A1  10/2002  Yano et al.

FOREIGN PATENT DOCUMENTS

JP    2001-255937    9/2001
WO    WO 01/37059 A1    5/2001

OTHER PUBLICATIONS

European Search Report dated Mar. 24, 2005.

* cited by examiner

*Primary Examiner*—Gertrude Arthur Jeangla
(74) *Attorney, Agent, or Firm*—McGinn IP Law Group, PLLC

(57) ABSTRACT

A base station is installed in a driver's house or the like where the precise position has been measured beforehand, includes a GPS antenna, a GPS receiver, and a wireless communication device, and functions to transmit various data to a vehicle serving as a moving station in a predetermined range. The vehicle has a GPS antenna, a GPS receiver, and a wireless communication device. When establishing communication between the base station and the moving station, if the current vehicle position generally matches any driving route created and stored in the storage unit earlier, automatic driving control is performed with the matching driving route serving as a target driving route. Conversely, if the current position of the vehicle matches no position on the driving routes created in the past even generally, the storage unit continuously stores the current driving route including the current position, as a new route to the destination.

16 Claims, 5 Drawing Sheets

DRIVING CONTROL DEVICE FOR A VEHICLE

This application claims benefit of Japanese Application No. 2003-409529 filed on Dec. 8, 2003, the contents of which are incorporated by this reference.

BACKGROUND OF THE INVENTION

1. Field of the Invention

The present invention relates to a driving control device for performing automatic control of a vehicle along a planned route by automatic steering or automatic acceleration/deceleration.

2. Description of the Related Art

In recent years, navigation devices are widely used for vehicles, which employ a Global Positioning System (GPS) for calculating the position of the vehicle based upon the position data received from satellites. Furthermore, various techniques have been proposed and put into practical use, wherein driving of the vehicle is controlled based upon the vehicle-position information obtained by the GPS and information regarding the road ahead of the vehicle detected with a camera or the like.

For example, a technique is disclosed in Japanese Unexamined Patent Application Publication No. 2001-255937, wherein a vehicle navigation system creates a route based upon a destination input by the driver, and performs automatic control of the vehicle by automatic steering or automatic acceleration/deceleration according to the route thus created serving as a target route.

However, the conventional technique as disclosed in the aforementioned Japanese Unexamined Patent Application Publication No. 2001-255937 has a problem that in a case wherein the target route created based upon the destination input by the driver is long, the target route contains a substantial number of intersections, forks, and turnoffs, leading to difficulty in automatic driving control due to complexity thereof. Furthermore, the route created by the navigation system does not match the route which the driver desires up to the destination at all times, leading to poor ease of use thereof. On the other hand, it is assumed that the navigation system which provides not only fixed information stored in the navigation system beforehand regarding the destination but also guiding information received in real time regarding the destination exhibits further improved ease of use.

SUMMARY OF THE INVENTION

The present invention has been made in order to solve the aforementioned problems, and accordingly, it is an object thereof to provide a driving control device for performing automatic driving control of a vehicle which allows the vehicle to reach a destination in a sure manner, as well as creating a desirable route which satisfies the driver in a sure manner, while providing the newest information received in real time regarding the destination, thereby providing high ease of use.

A driving control device for a vehicle according to the present invention comprises: a base station which has been set to a desired position that has been measured beforehand, for transmitting correction information to each point within a predetermined area based upon the information received from satellites orbiting the Earth; a moving station included in a vehicle for calculating the position of the vehicle based upon the information received from the base station and the information received from the satellites; driving-route storage means for storing the driving route along which the vehicle has moved; and control means wherein at the time of establishment of communication between the base station and the moving station, in the event that determination is made that the current position of the vehicle calculated by the moving station has generally matched any driving route which has been stored in the driving-route storage means in the past, the control means set the target driving route to the driving route stored in the past, and perform automatic driving control of the vehicle such that the vehicle reaches the destination according to the target driving route thus set, and on the other hand, in the event that determination is made that the current position of the vehicle calculated by the moving station has not generally matched any driving routes which have been stored in the driving-route storage means in the past, the control means continuously store the driving route including the current position, along which the vehicle is moving, in the driving-route storage means.

The above and other objects, features and advantages of the invention will become more clearly understood from the following description referring to the accompanying drawings.

DESCRIPTION OF THE PREFERRED EMBODIMENTS

Description will be made regarding an embodiment according to the present invention with reference to FIGS. 1 through 5.

Figure 1:
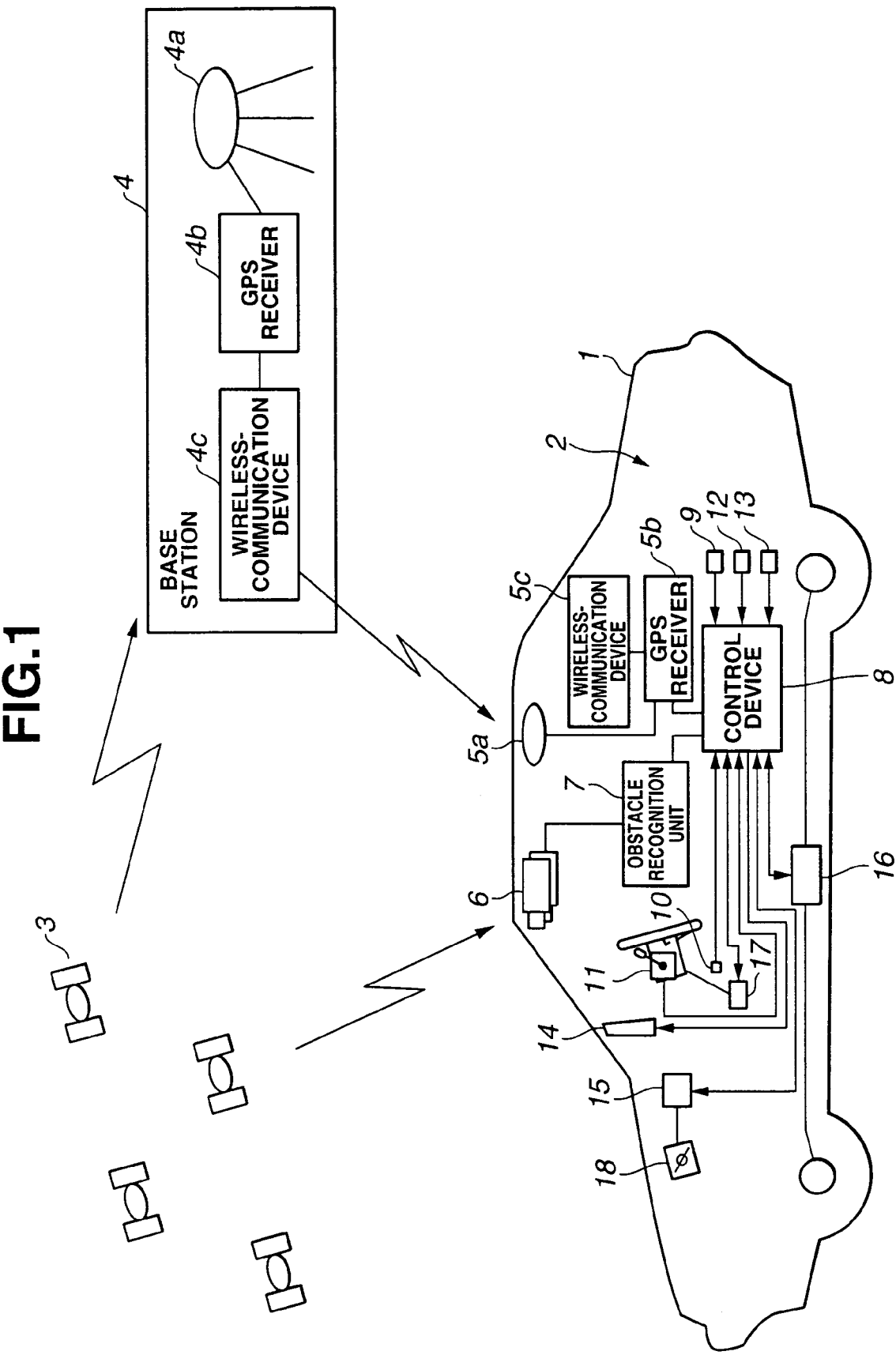
FIG. 1 is a schematic explanatory diagram which shows an overall configuration of a driving control device for a vehicle.

In FIG. 1, reference numeral 1 denotes a vehicle such as an automobile or the like serving as a moving station. The vehicle 1 includes a driving control device 2 for performing automatic driving control using a well-known RTK (Real-Time Kinematic) GPS which is a kind of GPSs described later.

That is to say, with the RTK-GPS employed in the present embodiment, the information (data such as satellite-orbit information required for calculation of the positioning and so forth) from satellites (GPS satellites) 3 orbiting the Earth is received by a base station 4, e.g., the house of the user or the like, which has been selected by the user, and the vehicle 1 serving as a moving station.

The base station 4 is installed at a position such as the house of the user or the like which has been measured beforehand with sufficient precision, and principally includes a GPS antenna 4a, a GPS receiver 4b, and a wireless communication device 4c. The base station 4 transmits the phase information with regard to the radio wave from the GPS satellites 3, the pseudo range, and the position coordinates of the base station 4, to a point which is to be measured, i.e., the vehicle 1 serving as a moving station, using the wireless communication device 4c. Specifically, the data transmitted from the base station 4 to the vehicle 1 includes: error-correction data; pseudo-range correction data; and the position coordinates of the base station 4.

Figure 4:
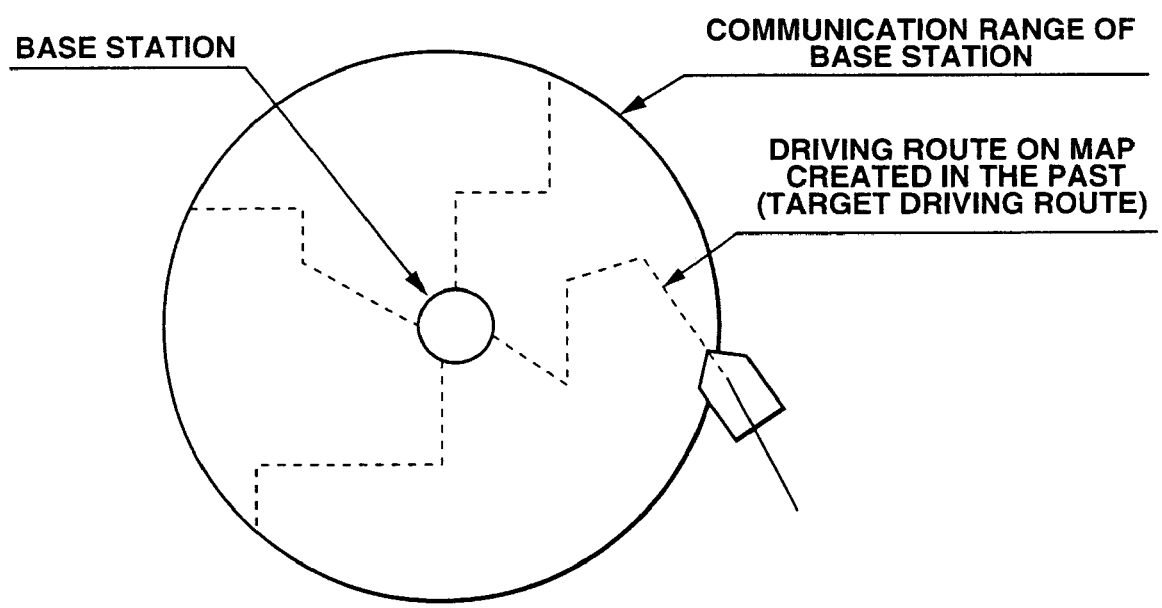
FIG. 4 is an explanatory diagram for describing communication range around a base station.

Here, the wireless communication device 4c serves as an access point for performing transmission/reception of information via wireless LAN (Local Area Network) stipulated by a predetermined communication standard such as IEEE802.11a/b/g or the like, for example, with an SSID (service Set ID), a WEP (Wired Equivalent Privacy) key, and an MAC (Media Access Control) address verification, each of which are unique for maintaining the security of communication. As a result, communication can be made within an area with the wireless communication device 4c as the center thereof with a radius of 50 to 100 m, as shown in FIG. 4.

The vehicle 1 serving as a moving station includes a GPS antenna 5a, a GPS receiver 5b, and a wireless communication device 5c. Upon the vehicle 1 entering the communication range of the aforementioned base station 4, communication is established between the vehicle 1 and the base station 4. At this time, the GPS receiver 5b calculates the position (position coordinates) of the vehicle with high precision (e.g., margin of error of 1 to 5 cm) in real time by analyzing the error correction data, the pseudo-range correction data, and the position coordinates received from the base station 4 (data received through the wireless communication device 5c) and the information directly received from the GPS satellites 3.

Furthermore, the vehicle 1 includes a control device 8 connected to the aforementioned GPS receiver 5b and a obstacle recognition unit 7 serving as obstacle detecting means for detecting obstacles ahead of the vehicle by monitoring the situation of the road ahead of the vehicle based upon images taken by a stereo camera 6. Note that the control device 8 receives the data of the position of the vehicle from the aforementioned GPS receiver 5b.

The stereo camera 6 has a function serving as stereo optical system, and comprises a pair of (left and right) CCD camera formed of solid state imaging device such as charge coupled devices (CCD) or the like. The left and right CCD cameras are mounted at front portions on the ceiling in the interior of the vehicle at a predetermined interval for taking stereo images of the objects outside the vehicle from separate view points. The stereo images thus taken are input to the obstacle recognition unit 7.

The obstacle recognition unit 7 performs image processing for the stereo images received from the stereo camera 6 as follows, for example. First, the obstacle recognition unit 7 performs image processing for a pair of stereo images of the situation outside the vehicle in the moving direction thereof taken by the CCD cameras of the stereo camera 6 for calculating distance information over the entire image based upon the offset of the position of the same object between the pair of images corresponding one to another with the triangular surveying method, thereby creating a distance image which represents the three-dimensional distribution. Then, the obstacle recognition unit 7 performs known grouping processing for the image data thus obtained, or compares the image data thus obtained to the three-dimensional data stored beforehand such as three-dimensional road-structure data, side-wall data, three-dimensional object data, and so forth, thereby extracting white-line data, the side-wall data containing information regarding guardrails, curbs, and so forth, and three-dimensional data containing information regarding other vehicles. Thus, the obstacle recognition unit 7 detects the three-dimensional data corresponding to the obstacles to the vehicle in the region determined by the moving direction of the vehicle (e.g., the region between the lines in the moving direction of the vehicle at a predetermined width, or the region between the white lines or curbs in the moving direction) from the three-dimensional data thus extracted. The detected obstacle data is input to the control device 8.

The control device 8 is connected to sensors such as a speed sensor 9 for detecting the speed V of the vehicle, a steering-angle sensor 10 for detecting the steering angle θH, and so forth, and switches such as a main switch 11 for switching to the automatic driving-control mode, a brake pedal switch 12, an accelerator pedal switch 13, and so forth.

Furthermore, the control device 8 includes an unshown readable/writable storage medium such as a hard disk, built-in memory, CD, DVD, or the like, which allows the system to create a map in a region where communication is made between the vehicle and the base station 4, and to read out the map information which has been created in the past. The map information is suitably displayed on a liquid crystal display 14 mounted on a dash board, for example. Specifically, the liquid crystal display 14 displays the route (planned route, i.e., node line) guided by automatic driving control, which contains the current positions of the base station 4 and the vehicle 1, the route (node line) which has been created in the past, or the route (node line) which is being created.

Furthermore, the control device 8 of the vehicle 1 is connected to actuators for performing automatic driving control, such as an electric throttle control device 15, a brake control device 16, and an electric power steering control device 17.

Figure 2:
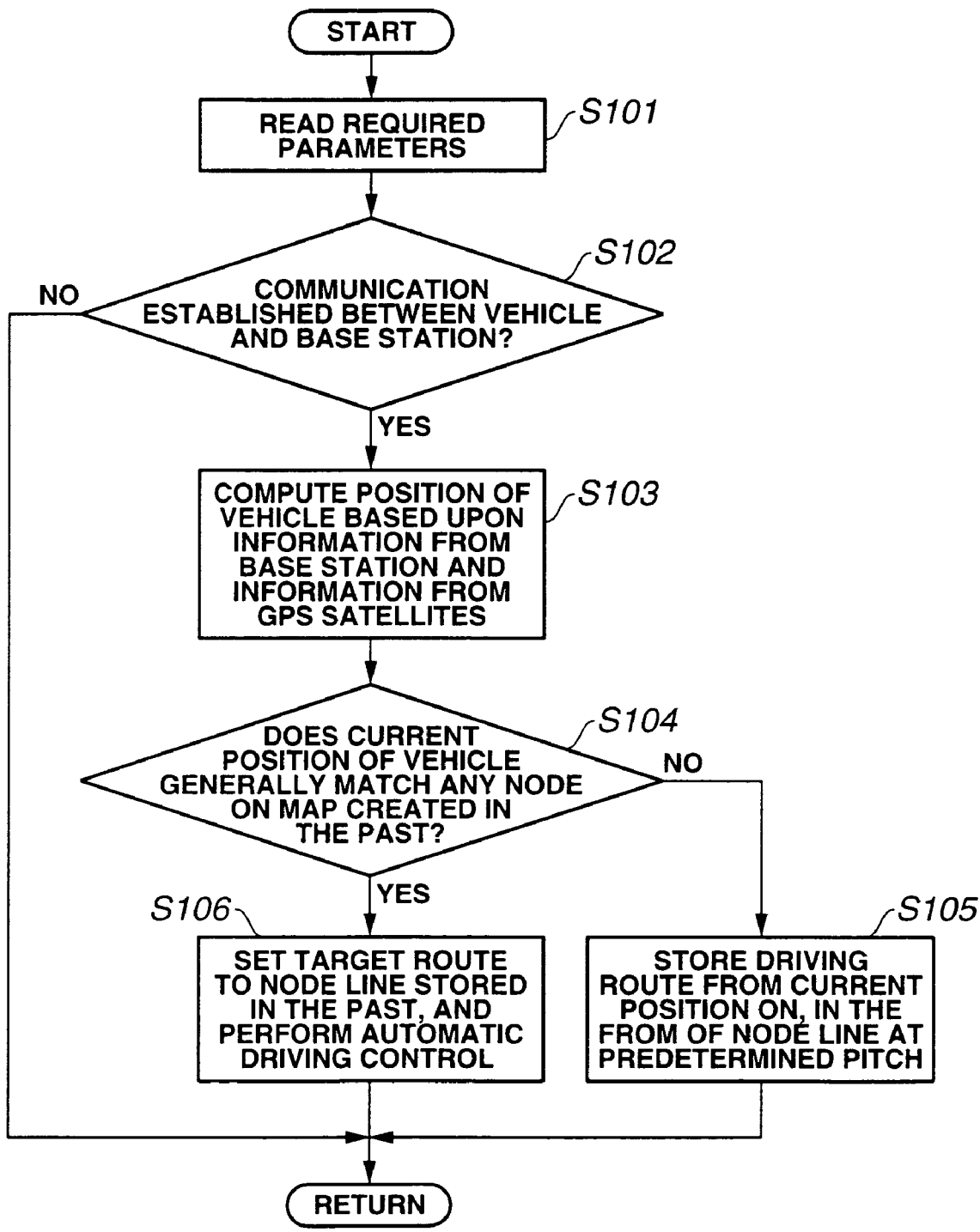
FIG. 2 is a flowchart for describing a main program for automatic driving control.

Upon the driver turning on the main switch 11 for switching to the automatic driving control mode, and setting the speed of the vehicle in the automatic driving control mode, communication is established between the vehicle and the base station 4 according to a program for automatic driving control shown in FIG. 2 described later. Then, in the event that determination is made that the current position of the vehicle 1 has been judged as generally match with any position on a route which has been created in the past, automatic driving control is performed according to the route containing the current position which has been created in the past serving as the target route. Specifically, the control device 8 outputs signals to the electric throttle control device 15 so as to operate a throttle 18 such that the vehicle is accelerated or decelerated in order to maintain the set speed of the vehicle. Furthermore, in the event that deceleration of the vehicle must be made beyond a predetermined deceleration, the control device 8 outputs signals to the brake control device 16 so as to operate an automatic brake. Furthermore, the control device 8 has a function for executing automatic steering by outputting signals to the electric power steering control device 17 according to a program for automatic steering shown in FIG. 3 described later, thereby allowing the system to change the moving direction of the vehicle. On the other hand, in a case wherein communication has been established between the vehicle 1 and the base station 4, but the current position of the vehicle 1 has been judged as different from (no match with) any position on the routes which have been created in the past, automatic driving control of the vehicle is not performed. Alternatively, the system stores the route containing the current position of the vehicle which is being created, in an unshown readable/writable storage medium such as a hard disk, built-in memory, CD, DVD, or the like. That is to say, the control device 8 according to the present embodiment has the functions serving as route storage means as well as control means.

Next, description will be made regarding the program for automatic driving control executed by the driving control device 2 with reference to a flowchart shown in FIG. 2. As shown in the flowchart in FIG. 2, upon the driver turning on the main switch 11 for switching to the automatic driving control mode, and setting the speed of the vehicle, the flow proceeds to Step (which will be abbreviated to "S" hereafter) 101, where the system reads out parameters required for automatic driving control according to the program executed at predetermined time intervals.

Next, the flow proceeds to S102, where determination is made whether or not the vehicle 1 has entered the communication range of the base station 4 and communication has been established therebetween. In the event that determination is made that communication has not been established therebetween, the flow exits from the program. Conversely, in the event that determination is made that communication has been established therebetween, the flow proceeds to S103, where the system computes the position of the vehicle based upon the information received with the GPS receiver 5b, i.e., the information received from the base station 4 and the information received from the GPS satellites 3, following which the flow proceeds to S104.

In S104, the system makes determination whether or not the current position of the vehicle 1 has been judged as generally match with any node on a map stored in the unshown readable/writable storage medium such as a hard disk, built-in memory, CD, DVD, or the like, (e.g., determination is made whether or not the current position has matched any node which has been created in the past within a margin of ±2 m).

In the event that in S104, determination is made that the current position of the vehicle 1 has been judged as different from (no match with) any node which has been created in the past, the flow proceeds to S105, where the system stores the route along which the vehicle is moving, including the current position, at a predetermined pitch (e.g., at a pitch of 3 to 5 m), in the unshown readable/writable storage medium such as a hard disk, built-in memory, CD, DVD, or the like. Note that storage of the new node line is restricted to a predetermined period of time (e.g., 15 minutes) and a predetermined distance (e.g., 300 m). In the event that the vehicle has not reached the destination beyond such restrictions, the system erases all the node line which has been stored in this step. The reason is that in the event that the vehicle has not reached the destination beyond such restriction, it is assumed that the vehicle has stopped and has not reached the destination, or the driver does not intend to reach the destination. Furthermore, in the event that failure in communication has occurred between the vehicle 1 and the base station 4, the system cannot create precise route, and accordingly, the system erases all the node line which has been stored in this step. Note that the route which has been stored in the past can be erased using driver software.

On the other hand, in S104, in the event that determination is made that the current position of the vehicle 1 has been judged as generally match with any node which has been created in the past, the flow proceeds to S106, where the node line containing the node which has generally matched the current position is set to the target route, and automatic driving control is performed as described above, following which the flow exits from the program. Note that in the event that the obstacle recognition unit 7 has detected some sort of obstacle ahead of the vehicle within a range of 10 m, in the event that the driver has steered the vehicle 1 beyond a predetermined steering angle, or in the event that the driver has pressed the accelerator pedal or the brake pedal, the automatic driving control is canceled.

Figure 3:
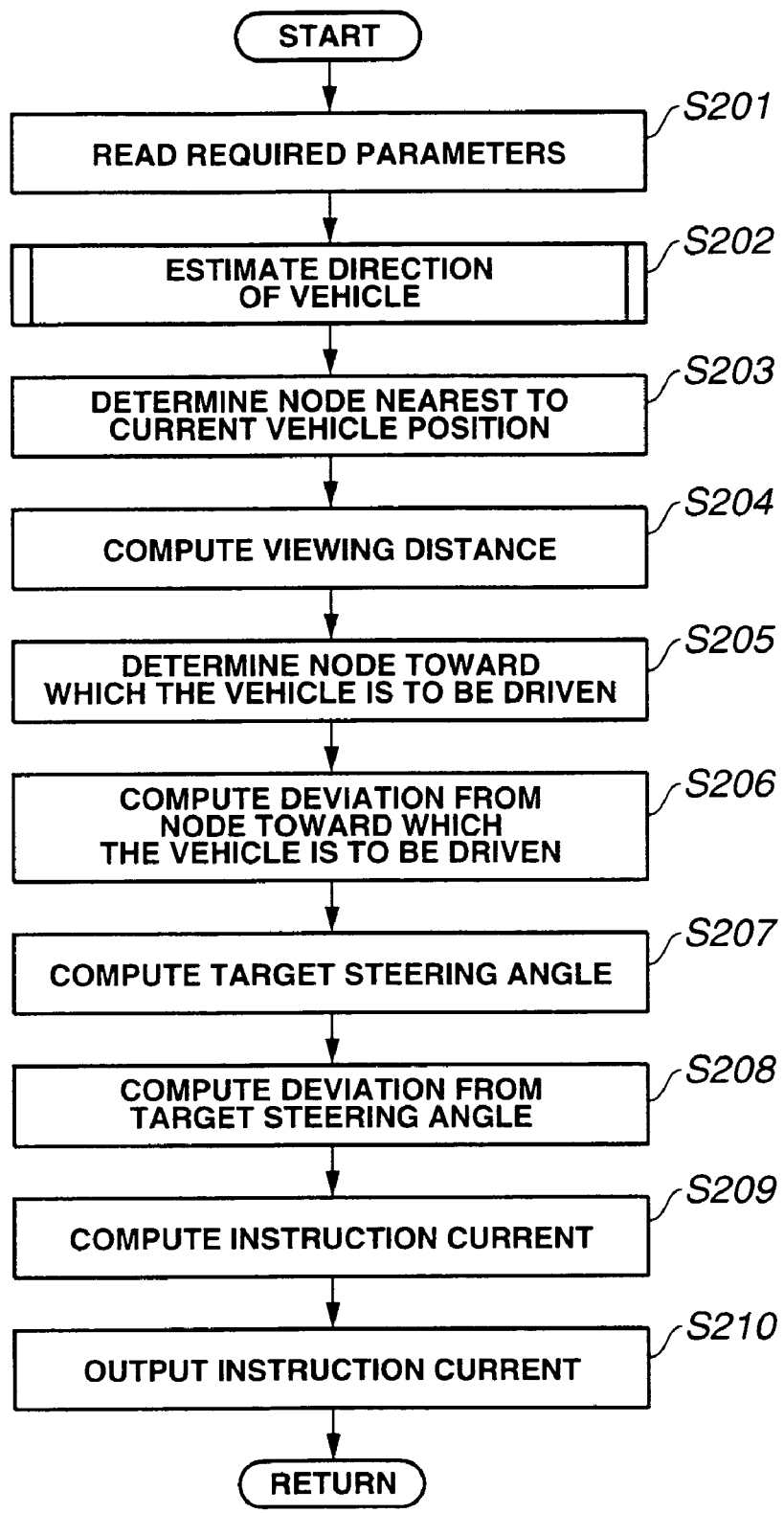
FIG. 3 is the flowchart which shows processing for automatic steering in an automatic driving control mode.
Figure 5:
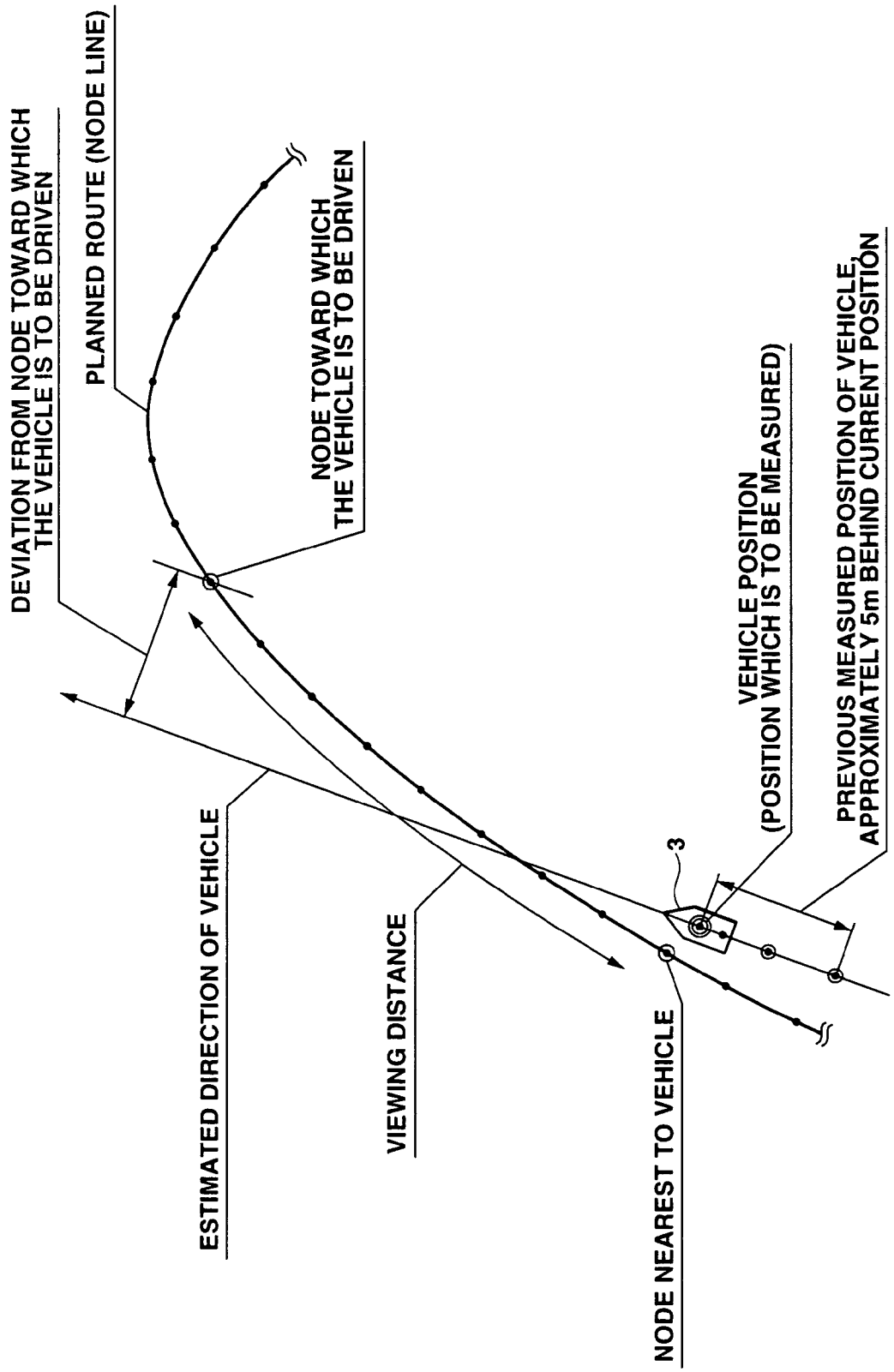
FIG. 5 is the explanatory diagram for describing the mechanism of the automatic steering.

Next, description will be made regarding automatic steering which is a part of the automatic driving control executed by the control device 8 of the vehicle 1 with reference to a flowchart shown in FIG. 3 and an explanatory diagram shown in FIG. 5 for describing a mechanism of automatic steering. First, in S201, the system reads out parameters required for automatic steering.

Subsequently, the flow proceeds to S202, where the system extracts the previous positioning point of the vehicle 1, a predetermined distance (e.g., 5 m) behind the current position thereof, from the history of the vehicle position stored in the past, and estimates the direction of the vehicle to be the direction passing through the previous positioning point thereof, a predetermined distance (e.g., 5 m) behind the current position thereof, and the current position thereof.

Next, the flow proceeds to S203, where the system determines the node on the planned route nearest to the current position of the vehicle.

Subsequently, the flow proceeds to S204, where the system calculates the viewing distance based upon the current speed of the vehicle and a predetermined viewing time (e.g., 1.5 sec). For example, in the event that the current speed of the vehicle is 20 km/h, the viewing distance is 5.56 m×1.5 sec=8.34 m.

Subsequently, the flow proceeds to S205, where the system determines a node on the planned route near the position, the viewing distance calculated in S204 ahead of the current position of the vehicle, and sets the node thus determined as a node toward which the vehicle is to be driven.

Next, the flow proceeds to S206, where the system computes the lateral deviation of the direction of the vehicle from the node toward which the vehicle is to be driven, as the target node deviation $\Delta D$.

Next, the flow proceeds to 3207, where the system calculates the target steering angle $\delta h$ such that the target node deviation $\Delta D$ becomes zero using Expression (1) described below.

$$\delta h = Gp \cdot \Delta D + Gd \cdot (d(\Delta D)/dt) \tag{1}$$

Note that Gp represents a proportional gain, and Gd represents a differential gain.

Next, the flow proceeds to S208, where the system computes the steering-angle deviation $\Delta\delta$ ($=\delta h - \theta H$) based upon the calculated target steering angle $\delta h$ and the actual steering angle $\theta H$ detected by the steering-angle sensor 10.

Subsequently, the flow proceeds to S209, where the system computes the instruction current $I\delta$ for being applied to an electric power steering motor of the electric power steering control device 17 such that the steering-angle deviation $\Delta\delta$ becomes zero according to Expression (2) described below. Subsequently, the flow proceeds to S210, where the system outputs the instruction current $I\delta$, whereby the routine of the program ends.

$$I\delta = Kp \cdot \Delta\delta + Kd \cdot (d(\Delta\delta)/dt) + Ki \cdot \int \Delta\delta dt \tag{2}$$

Note that Kp is a proportional gain, Kd is a differential gain, and Ki is an integral gain.

As described above, the driving control device according to the present embodiment allows the user to set a desired position such as the house of the user or the like to the base station 4, thereby exhibiting high ease of use.

Furthermore, the driving control device according to the present embodiment has a function for performing automatic driving control of the vehicle only around the base station 4, thereby avoiding a problem of difficulty in automatic control driving due to the great number of intersections on a long route, and thereby improving ease of use.

Furthermore, the driving control device according to the present embodiment has a function for performing automatic driving control of the vehicle around the base station 4 according to the route along which the driver has driven the vehicle in the past serving as the target route. That is to say, automatic driving control is performed according to the route which the driver desires, thereby exhibiting high ease of use.

Furthermore, the driving control device according to the present embodiment has a function for setting the route at a fine pitch around the base station 4, along which the driver has driven the vehicle in the past, thereby allowing the driver to immediately modify the route for dealing with change in the situations in the region around the base station 4 due to road work, change in traffic rules, or the like.

Furthermore, with the driving control device according to the present embodiment, in a case wherein the vehicle 1 has entered the communication range of the base station 4 along the route along which the driver has driven the vehicle in the past, automatic driving control of the vehicle is performed without any particular operation or without fine setting every time for automatic driving control, thereby exhibiting high operability.

Furthermore, with the driving control device according to the present embodiment, in the event that the system has detected any obstacle, automatic driving control is canceled, thereby exhibiting sufficient safety. Furthermore, in the event that the driver operates the brake pedal, the accelerator pedal, or the steering, automatic driving control is canceled, thereby improving the safety of the automatic driving control sufficiently in agreement with the intention of the driver.

While description has been made regarding an arrangement according to the embodiment of the present invention wherein the obstacle detecting means detect an obstacle based upon images taken by the stereo camera 6, an arrangement may be made wherein the obstacle detecting means detect an obstacle using ultrasonic sensor or the like.

Furthermore, while description has been made regarding an arrangement according to the embodiment of the present invention wherein the system selects the target route from the driving routes along which the driver has driven the vehicle in the past, an arrangement may be made wherein the system allows the driver to store a desired driving route in memory of the system.

Furthermore, while description has been made regarding an arrangement according to the embodiment of the present invention wherein the system of the vehicle 1 receives information from the base station 4 via wireless LAN stipulated by a generally-used wireless LAN standard, the present invention is not restricted to the aforementioned arrangement, rather, an arrangement may be made wherein the information is transmitted to the system in the vehicle 1 using any wireless means. For example, an arrangement may be made wherein transmission of information is made using a known wireless device such as a cellular phone, a mobile terminal, a PDA (Personal Digital Assistant), or the like, stipulated by the so-called Bluetooth standard.

Furthermore, while description has been made regarding an arrangement according to the embodiment of the present invention wherein the system in the vehicle 1 receives only correction information from the base station 4 for calculating the position of the vehicle 1, an arrangement may be made wherein the base station 4 transmits other information to the system in the vehicle 1. For example, in a case wherein the base station 4 has been set to the house of the driver, the base station 4 may transmit security information (e.g., the state of a burglar alarm or fire alarm), information regarding the operating state of lights, TV set, personal computer, and so forth (home-electronics information), information whether or not any inhabitants are at home, which is indicated by a ON/OFF signal (in a case wherein anyone is at home, the signal is turned on, otherwise, in a case wherein no one is at home, the signal is turned off), or the like, to the system in the vehicle 1.

Furthermore, in a case wherein the base station 4 has been set to a service station for the vehicle, the base station 4 may transmit information regarding service which is handled by the service station, sales information, or the like, to the system in the vehicle 1, thereby improving efficiency of service. Furthermore, in this case, upon the vehicle entering the communication range of the service station, the system allows the vehicle to reach the service station without losing the way to the service station, thereby greatly improving service quality. Furthermore, in this case, the service station may distribute inexpensive recording media such as CDs, DVDs, or the like, storing the driving route to the service station, thereby further improving sales of service.

Furthermore, while description has been made regarding an arrangement according to the embodiment of the present invention wherein the control device 8 of the vehicle 1 has a function for storing the information regarding the driving route around the base station 4, an arrangement may be made wherein the base station 4 has the aforementioned function.

Furthermore, while description has been made regarding an arrangement according to the embodiment of the present invention wherein the base station 4 is set to the house of the driver or the like, the present invention is not restricted to the aforementioned arrangement, rather, an arrangement may be made wherein the base station 4 is set to a position within a predetermined area such as a factory, a car park, or the like. In this case, communication can be made over the predetermined area, thereby enabling automatic driving control of the vehicle thereover.

As described above, the present invention provides an automatic driving device having functions for performing automatic driving control of a vehicle which allows the vehicle to reach the destination in a sure manner, as well as automatically selecting a route which the driver desires, while receiving the newest information regarding the destination, thereby improving ease of use.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A driving control device for a vehicle comprising:
   a base station which has been set to a position that has been measured beforehand, for transmitting correction information to each point within a predetermined area based upon an information received from satellites orbiting the Earth;
   a moving station included in said vehicle for calculating a position of the vehicle based upon an information received from said base station and the information received from said satellites;
   driving-route storage means for storing a driving route along which said vehicle has moved; and
   control means wherein at a time of establishment of communication between said base station and said moving station, if determination is made that the a current position of said vehicle calculated by said moving station has been judged as generally matching with any driving route which has been stored previously in said driving-route storage means, said control means sets a target driving route to said driving route stored previously, and performs automatic driving control of said vehicle such that said vehicle reaches a destination according to said target driving route thus set, and on the other hand, if determination is made that the current position of said vehicle calculated by said moving station has been judged as different from any driving routes which have been stored previously in said driving-route storage means, said control means continuously stores the driving route including the current position, along which said vehicle is moving, in said driving-route storage means.

2. The driving control device for the vehicle according to claim 1, wherein at least one of said base station and said moving station includes said driving-route storage means.

3. The driving control device for the vehicle according to claim 1, further comprising obstacle detecting means for detecting an obstacle ahead of said vehicle along the driving route, wherein if said obstacle detecting means detects the obstacle, said automatic driving control is canceled.

4. The driving control device for the vehicle according to claim 1, wherein information transmitted from said base station includes other information as well as said correction information.

5. The driving control device for the vehicle according to claim 2, wherein information transmitted from said base station includes other information as well as said correction information.

6. The driving control device for the vehicle according to claim 2, further comprising obstacle detecting means for detecting the obstacle ahead of said vehicle along the driving route, wherein if said obstacle detecting means detects the obstacle, said automatic driving control is canceled.

7. The driving control device for the vehicle according to claim 6, wherein information transmitted from said base station includes other information as well as said correction information.

8. The driving control device for the vehicle according to claim 3, wherein information transmitted from said base station includes other information as well as said correction information.

9. A driving control device for a vehicle comprising:
a base station which has been set to a position that has been measured beforehand, for transmitting correction information to each point within a predetermined area based upon an information received from satellites orbiting the Earth;
a moving station included in said vehicle for calculating a position of the vehicle based upon an information received from said base station and the information received from said satellites;
driving-route storage means for storing a driving route along which said vehicle has moved; and
control means wherein at a time of establishment of communication between said base station and said moving station, if determination is made that a current position of said vehicle calculated by said moving station has been judged as generally matching with any driving route which has been stored previously in said driving-route storage means, said control means sets a target driving route to said driving route stored previously, and performs automatic driving control of said vehicle such that said vehicle reaches a destination according to said target driving route thus set.

10. The driving control device for the vehicle according to claim 9, wherein at least one of said base station and said moving station includes said driving-route storage means.

11. The driving control device for the vehicle according to claim 9, further comprising obstacle detecting means for detecting the obstacle ahead of said vehicle along the driving route, wherein if said obstacle detecting means detects the obstacle, said automatic driving control is canceled.

12. The driving control device for the vehicle according to claim 9, wherein information transmitted from said base station includes other information as well as said correction information.

13. The driving control device for the vehicle according to claim 10, wherein information transmitted from said base station includes other information as well as said correction information.

14. The driving control device for the vehicle according to claim 10, further comprising obstacle detecting means for detecting the obstacle ahead of said vehicle along the driving route, wherein if that said obstacle detecting means detects the obstacle, said automatic driving control is canceled.

15. The driving control device for the vehicle according to claim 11, wherein information transmitted from said base station includes other information as well as said correction information.

16. The driving control device for the vehicle according to claim 14, wherein information transmitted from said base station includes other information as well as said correction information.

* * * * *